United States Patent [19]
Sasaki et al.

[11] 3,767,549
[45] Oct. 23, 1973

[54] METHOD FOR PRODUCING BASIC ALUMINUM CHLORIDE

[75] Inventors: Kyoichi Sasaki; Susumu Isohata, both of Tokyo; Masaaki Kato, Nobeoka; Masahiko Murakoshi, Tokyo, all of Japan

[73] Assignee: Asahi Kasei Kogyo Kabushiki Kaisha, Osaka, Japan

[22] Filed: Sept. 22, 1971

[21] Appl. No.: 182,585

[30] Foreign Application Priority Data
Sept. 24, 1970  Japan.............................. 45/82980

[52] U.S. Cl................................ 204/180 P, 204/94
[51] Int. Cl............................................. B01d 13/02
[58] Field of Search .................. 204/180 P, 301, 94

[56] References Cited
UNITED STATES PATENTS
| | | | |
|---|---|---|---|
| 2,723,229 | 11/1955 | Bodamer ........................ | 204/180 P |
| 3,111,472 | 11/1963 | Oda et al........................ | 204/180 P |
| 3,113,911 | 12/1963 | Jones............................ | 204/180 P X |
| 3,347,761 | 12/1967 | Bicek............................ | 204/180 P X |

Primary Examiner—John H. Mack
Assistant Examiner—A. C. Prescott
Attorney—Cushman, Darby et al.

[57] ABSTRACT

Basic aluminum chloride can be produced by allowing an aqueous solution of basic aluminum chloride or of aluminum chloride to exist in compartments bounded on anode side by anion-exchange membrane and on cathode side by cation-exchange membrane in an electrolytic cell in which anion-exchange membrane and cation-exchange membrane are alternately disposed and allowing an aqueous solution of an electrolyte to exist in compartments adjacent to the said compartments and applying current through the electrodes to increase the basicity of the aqueous solution of basic aluminum chloride or of aluminum chloride. Such method does not require many electrodes, does not require high power and causes no generation of chlorine.

8 Claims, 2 Drawing Figures

METHOD FOR PRODUCING BASIC ALUMINUM CHLORIDE

The present invention relates to a method for producing basic aluminum chloride having a complex ion structure represented by the general formula $[Al_2(OH)_nCl_{6-n}]_m$ (wherein $0 < n < 6$ and $m > 0$). More particularly, it concerns a method for producing an aqueous solution of basic aluminum chloride which comprises allowing an aqueous solution of basic aluminum chloride or of aluminum chloride to exist in compartments bounded on anode side by anion-exchange membrane and on cathode side by cation-exchange membrane in an electrolytic cell in which anion-exchange membrane and cation-exchange membrane are alternately disposed and allowing an aqueous solution of an electrolyte to exist in compartments adjacent to the said compartments and applying current through the electrodes to increase the basicity of the aqueous solution of basic aluminum chloride or of aluminum chloride. Said basicity is expressed in terms of equivalent ratio of OH to Al.

Various methods for producing basic aluminum chloride have been known. However, according to the method for producing an aqueous solution of basic aluminum chloride by electrolysis, generation of $H_2$ and $Cl_2$ cannot be avoided due to electrolysis of an aqueous solution of aluminum chloride and moreover many electrodes are required when production of aqueous solution of basic aluminum chloride in a large amount is intended.

According to the present invention, said defects have been improved and overcome utilizing the selective permeability of ion-exchange membrane to ions.

The present invention does not require many electrodes as compared with the conventional method by electrolysis. Therefore, the electrolytic cell can be made into small size and the problem of consumption of electrode can also be almost completely overcome. Furthermore, the present invention has a great advantage that power required is lowered because of type of reaction and structure of cell. In addition, in some case, it is also an advantage that no chlorine is produced and most of chlorine can be recovered as dilute hydrochloric acid. Since the aqueous solution of basic aluminum chloride obtained by the present invention contains no impurities, it is especially excellent in stability with lapse of time and provides a remarkable effect when used for purification of waste water.

The method of the present invention has been attained by applying an electrodialysis method which uses ion-exchange membrane to electrolysis of an aqueous solution of basic aluminum chloride. According to the method, $H^+$ and $OH^-$ generated by electrolysis are not gasified due to loss of charges thereof and $H^+$ is allowed to migrate to the adjacent compartment through cation-exchange membrane and $OH^-$ is exchanged with $Cl^-$ of basic aluminum chloride. The exchanged $Cl^-$ is allowed to migrate to the another adjacent compartment in the direction opposite to the direction of $H^+$ migration.

Figure 2:
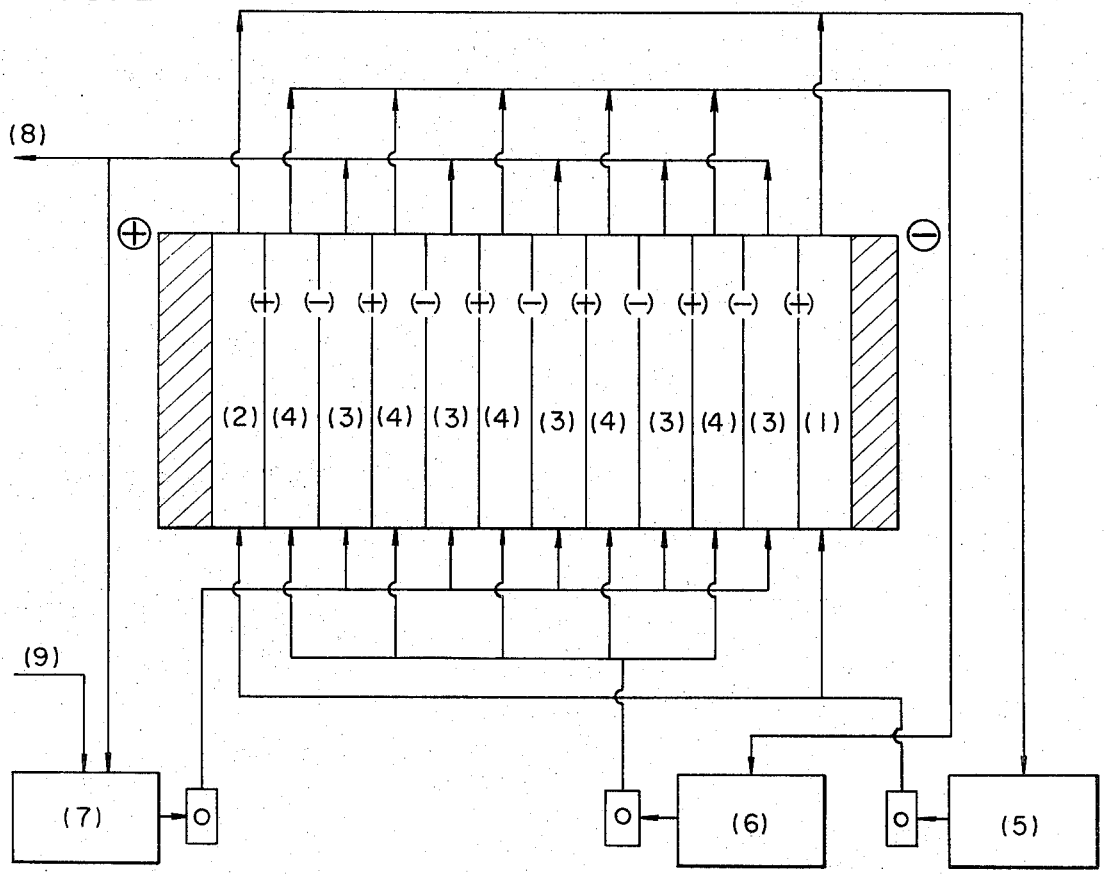
FIG. 2 shows an apparatus used for one embodiment of the present invention.

The theory of the method of the present invention will be more detailedly explained with reference to FIG. 1.

The compartment bounded on one side by an anion-exchange membrane and on the opposite side by a cation-exchange membrane is filled with an aqueous solution of basic aluminum chloride. Said compartment is called compartment 3. A compartment (called compartment 4) adjacent to said compartment 3 is filled with an aqueous solution of an electrolyte. The basic aluminum chloride in compartment 3 consists of anion $Cl^-$ and macromolecule cation represented by $[Al_2(OH)_n]_m^{+(6-n)m}$. When a current is applied in the direction of the arrow, $Cl^-$ migrates to compartment 4 through anion-exchange membrane , but cation which is macroion cannot permeate cation-exchange membrane . (According to the experiments, when the basicity is higher than 40 %, the difficulty of said macroion permeating the cation-exchange membrane is conspicuously increased and efficiency of the method of the present invention is increased.) Therefore, water dissociates and $H^+$ permeates membrane to migrate to compartment 4. $OH^-$ formed at this time combines with Al to increase the basicity of basic aluminum chloride. That is, value of n in said formula is increased. In accordance with the mechanism as mentioned above, the basicity of the aqueous solution in compartment 3 is increased. If an aqueous solution of aluminum chloride or basic aluminum chloride of a low basicity is appropriately supplied to compartment 3, basic aluminum chloride can be produced in such a manner that the amount of the basic aluminum chloride is increased while keeping the basicity substantially constant.

It is also possible to produce an aqueous solution of basic aluminum chloride from an aqueous solution of aluminum chloride which is present in compartment 3 instead of aqueous solution of basic aluminum chloride. However, in such case, aluminum ion is not in the form of macroion. Therefore, it is desirable to use cation-exchange membrane which is selectively permeable to only monovalent cations and difficultly permeable to polyvalent cations. (However, even with the usual cation-exchange membrane, said reaction can proceed at a relatively low efficiency because aluminum ion permeates the cation-exchange membrane with somewhat difficulty.) The reaction mechanism in this case is the same as explained above. The cation-exchange membranes which are difficultly permeable to polyvalent cations are known. Therefore, with use of such cation-exchange membrane, the present invention can also be effectively carried out even with direct use of an aqueous solution of aluminum chloride. (Even when basic aluminum chloride is allowed to be present in compartment 3, the use of the cation-exchange membrane which is difficulty permeable to polyvalent cations is desirable and causes increase of current efficiency.)

Application of current results in a slight reduction of the amount of solution in compartment 3 and this reduction is due to migration of water caused by electrodialysis.

Figure 1:
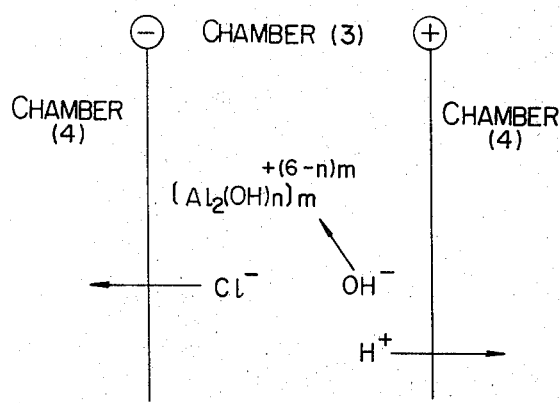
FIG. 1 is a diagram which indicates the theory of the present invention.

Compartment 4 in FIG. 1 is filled with an electrolyte solution. Various electrolytes such as sodium chloride, potassium chloride, aluminum chloride, magnesium chloride, etc. may be used as said electrolyte solution. Among them, aqueous solution of aluminum chloride is preferable as the solution in compartment 4 because use of it can prevent incorporation of impurities into aqueous solution of basic aluminum chloride. Migration of $H^+$ and $Cl^-$ from compartment 3 causes accumulation of hydrochloric acid in compartment 4. However, when acid concentration in compartment 4 is high, hydrogen ion migrates to compartment 3 through anion-exchange membrane (anion-exchange membrane can prevent permeation of other cations, but cannot fully prevent permeation of hydrogen ion), whereby OH is neutralized to cause reduction of current efficiency. Therefore, preferably, pH in compartment 4 is higher than 2.0. For this purpose, it is very effective to add neutralization step with aluminum hydroxide or metallic aluminum and acid removal step such as distillation, adsorption, etc. of hydrochloric acid to recycling process of the solution in compartment 4 so that concentration of hydrochloric acid in compartment 4 should not increase. By this procedure, the solution in compartment 4 is always kept at relatively high pH value to prevent migration of hydrogen ion to compartment 3.

When aluminum chloride which is recycled into compartment 4 as it is, or said aluminum chloride basicity of which is increased by addition of aluminum hydroxide or metallic aluminum or said aluminum chloride which is further concentrated is used as a raw material for compartment 3, no losses of aluminum ion (a small part of which migrates from compartment 3 to compartment 4 during application of current) and of chlorine ion are caused to provide an industrially great advantage.

The apparatus for carrying out the present invention comprises [anode compartment-compartment 4 - compartment 3 . . . . compartment 4 - compartment 3 - cathode compartment]. Said anode compartment and cathode compartment are filled with aqueous solution of electrolyte such as dilute sulfuric acid. One embodiment of the apparatus will be explained in connection with FIG. 2.

In FIG. 2, 1 indicates a cathode compartment and 2 indicates anode compartment. Iron, nickel, stainless steel, graphite, etc. are used for the cathode and graphite, platinum-plated titanium, etc. are used for the anode. Five anion-exchange membranes (−) and four cation-exchange membranes (+) are alternately disposed between cathode compartment 1 which is partitioned by cation-exchange membrane (+) and anode compartment 2 which is partitioned by cation-exchange membrane. In short, the membranes are disposed in a series in the sequence of (+), (−) . . . . to form five compartments 4 for aqueous solution of electrolyte and five compartments 3 for raw material liquid as shown in FIG. 2. In this embodiment, five sets of compartments 3 and 4 are disposed, but is industrially advantageous to use more compartments.

To electrode compartments 1 and 2 is supplied dilute sulfuric acid (or other electrolyte solutions) from electrolyte storage tank 5 and said electrolyte is recycled to the tank 5. An aqueous solution of aluminum chloride (or other aqueous solution of electrolyte) is supplied to compartment 4 from tank 6 and is recycled to the tank 6. Hydrochloric acid concentration of said aqueous solution is increased by hydrogen chloride formed by electrolysis. Aqueous solution of basic aluminum chloride is supplied to raw material compartment 3 from tank 7 and recycled thereto. Said aqueous solution of basic aluminum chloride gains $OH^-$ and releases $H^+$ and $Cl^-$ in compartment 3, whereby aqueous solution of basic aluminum chloride of higher basicity is produced. This is taken out from pipe 8. In this case, also aqueous solution of aluminum chloride can be continuously added through pipe 9 to obtain an aqueous solution of basic aluminum chloride of a desired basicity.

According to the present invention, aqueous solution of basic aluminum chloride of a desired basicity can be easily obtained by optionally adjusting current density, amount of aqueous solution of aluminum chloride to be added, etc.

The present invention will be illustrated by the following Examples.

EXAMPLE 1

An electrolytic cell was constructed as shown in FIG. 2. As cation-exchange membrane, "CK-1" manufactured by Asahi Kasei Kogyo Kabushiki Kaisha was used and as an anion-exchange membrane, "CA-1" manufactured by the same company was used. The distance between the ion-exchange membranes was 1.0 mm, the distance between the terminal membrane and the electrode was 3 mm and effective area through which current was passed was 0.5 $dm^2$ (width 50 mm and height 100 mm). As the anode, a titanium plate of 3 mm in thickness on which platinum was plated in a thickness of 5 microns was used and as the cathode, a stainless steel plate of 2 mm in thickness was used. Aqueous solution of basic aluminum chloride having an aluminum concentration of 1.0 mol/l and a basicity of 50 % was passed through raw material liquid compartments 3, 1.0 mol/l of $AlCl_3$ solution was passed through the electrolyte solution compartment 4 and 1.0 N aqueous solution of $H_2SO_4$ was passed through cathode compartment 1 and anode compartment 2 at a linear velocity of 3 cm/sec and direct current of 1.5 Amp was passed through the electrodes (voltage between both electrodes was about 10 V). One mol/l of $AlCl_3$ was continuously added at 120 ml/Hr to liquid supplying tank 7 from pipe 9.

As the result, aqueous solution of basic aluminum chloride having an aluminum concentration of about 1.0 mol/l and a basicity of 50 % was obtained at 115 ml/Hr. (Current efficiency was 63 %).

EXAMPLE 2

Using the same apparatus as in Example 1, 1 l of aqueous solution of basic aluminum chloride having an aluminum concentration of 1.0 mol/l and a basicity of 25 % was passed through compartment 3, 1.0 mol/l of $AlCl_3$ solution was passed through compartment 4 and 1.0 N $H_2SO_4$ aqueous solution was passed through cathode compartment 1 and anode compartment 2 at a linear velocity of 3 cm/sec. Direct current of 1.5 Amp was passed through the electrodes (voltage between the electrodes was about 10 V).

After 2.5 hours' application of current, 0.98 of aqueous solution of basic aluminum chloride having an aluminum concentration of 1.01 mol/l and a basicity of 35.5 % was obtained. (The current efficiency was 43 %).

EXAMPLE 3

An apparatus which is the same as that in the Example 1 except that cation-exchange membrane which was selectively permeable to monovalent cations and not permeable to polyvalent ions was used was employed. One *l* of 1.0 mol/l AlCl₃ aqueous solution was passed through the compartment 3, 1.0 mol/l of AlCl₃ aqueous solution was passed through compartment 4 and 1.0 N H₂SO₄ aqueous solution was passed through cathod compartment 1 and anode compartment 2 at a linear velocity of 3 cm/sec. Direct current of 1.5 Amp was passed through the electrodes. (Voltage between the electrodes was about 10 V). A cation-exchange membrane which comprises sulfonic acid type uniform cation-exchange membrane and a thin layer of 4-vinyl pyridine polymer adhered to one surface of said membrane was used. After 14.5 hours' application of current, 0.9 *l* of aqueous solution of basic aluminum chloride having an aluminum concentration of 1.0 mol/l and a composition of $Al_2(OH)_3Cl_3$ was obtained at a current efficiency of 33 %.

EXAMPLE 4

Using the same apparatus as used in the Example 1, 1 *l* of aqueous solution of basic aluminum chloride having an aluminum concentration of 1.0 mol/l and a basicity of 50 % was passed through compartment 3, 1.0 mol/l of AlCl₃ was passed through compartment 4 and 1.0 N H₂SO₄ aqueous solution was passed through cathode compartment 1 and anode compartment 2 at a linear velocity of 3 cm/sec. The electrolyte solution containing free hydrochloric acid from compartment 4 was passed through a reaction tube of 20 cm in diameter and 100 cm in height packed with spheroidal aluminum hydroxide having a diameter of 10 mm and recycled to tank 6. Direct current of 1.5 Amp was passed through the electrodes (voltage between the electrodes was about 10 V). One mol/l of AlCl₃ was continuously added to the raw material supplying tank 7 from pipe 9 at 135 ml/Hr. As the result, aqueous solution of basic aluminum chloride having an aluminum concentration of about 1.0 mol/l and a basicity of 50 % was obtained at 130 ml/Hr. (Current efficiency was 71 %). The pH of the solution in tank 6 was 2.8.

EXAMPLE 5

Basic aluminum chloride was produced by the same procedure as employed in Example 4 except that in place of allowing the electrolyte solution containing free hydrochloric acid from compartment 4 to pass through the reaction tube of 20 cm in diameter and 100 cm in height packed with spheroidal aluminum hydroxide having a diameter of 20 cm, the electrolyte solution containing free hydrochloric acid from the compartment 4 was passed through a distilling column to remove the free hydrochloric acid and the solution was recycled to tank 6. As the result, aqueous solution of basic aluminum chloride having an aluminum concentration of about 1.0 mol/l and a basicity of 50 % was obtained at 130 ml/Hr. (Current efficiency was 70 %). The pH of the solution in tank 6 was 2.7.

What is claimed is:

1. A method for producing basic aluminum chloride, which comprises allowing an aqueous solution of basic aluminum chloride or of aluminum chloride to be present in compartments bounded on anode compartment side by anion-exchange membrane and on cathode compartment side by cation-exchange membrane, allowing an aqueous solution of an electrolyte to be present in compartments on both sides of said compartments and flowing electric current through the electrodes to increase basicity of said aqueous solution in the former compartments.

2. A method according to claim 1, wherein basic aluminum chloride having a basicity of higher than 40 % is present in the compartments bounded on the anode compartment side by anion-exchange membrane and on the cathode compartment side by cation-exchange membrane.

3. A method according to claim 1, wherein basic aluminum chloride produced is recycled and supplied to the compartments bounded on anode compartment side by anion-exchange membrane and on cathode compartment side by cation-exchange membrane.

4. A method according to claim 1, wherein aluminum chloride is added to the produced basic aluminum chloride to keep the basicity thereof constant and this basic aluminum chloride is recycled to the compartments bounded on anode compartment side by anion-exchange membrane and on cathode compartment side by cation-exchange membrane.

5. A method according to claim 1, wherein aluminum chloride which is allowed to be present in the compartments bounded on the anode compartment side by cation-exchange membrane and on the cathode compartment side by anion-exchange membrane and is recycled is allowed keep the basicity at higher than 0.

6. A method according to claim 1, wherein membranes which are difficultly permeable to polyvalent ions and easily permeable to monovalent ions are used.

7. A method according to claim 1, wherein dilute sulfuric acid or hydrochloric acid is allowed to be present in cathode solution and dilute sulfuric acid in anode solution.

8. A method according to claim 1, wherein aluminum chloride which is allowed to be present in the compartments bounded on the anode compartment side by cation-exchange membrane and on the cathode compartment side by anion-exchange membrane and is recycled is allowed to distill to remove hydrochloric acid at recycling course.

* * * * *